US010013742B2

United States Patent
Oniki et al.

(10) Patent No.: US 10,013,742 B2
(45) Date of Patent: Jul. 3, 2018

(54) IMAGE PROCESSING APPARATUS, OPTICAL APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Takashi Oniki, Utsunomiya (JP); Koshi Hatakeyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/444,718

(22) Filed: Feb. 28, 2017

(65) Prior Publication Data
US 2017/0262966 A1    Sep. 14, 2017

(30) Foreign Application Priority Data
Mar. 8, 2016  (JP) ................. 2016-044804

(51) Int. Cl.
| H04N 5/217 | (2011.01) |
| G06T 5/00  | (2006.01) |
| G06T 5/20  | (2006.01) |
| H04N 5/232 | (2006.01) |
| H04N 5/357 | (2011.01) |

(52) U.S. Cl.
CPC .............. *G06T 5/004* (2013.01); *G06T 5/20* (2013.01); *H04N 5/217* (2013.01); *H04N 5/23229* (2013.01); *H04N 5/3572* (2013.01)

(58) Field of Classification Search
CPC ................ H04N 5/23229; G06T 5/001–5/004
USPC ...................................................... 348/241
See application file for complete search history.

(56) References Cited

U.S. PATENT DOCUMENTS

| 8,391,637 | B2  |     | 3/2013  | Kinoshita |            |
|-----------|-----|-----|---------|-----------|------------|
| 2011/0285879 | A1 | *  | 11/2011 | Hatakeyama | G06T 5/003 |
|           |     |     |         |           | 348/241    |
| 2013/0038749 | A1 | *  | 2/2013  | Hatakeyama | G06T 5/003 |
|           |     |     |         |           | 348/222.1  |
| 2013/0322753 | A1 | *  | 12/2013 | Lim       | G06T 5/001 |
|           |     |     |         |           | 382/167    |
| 2014/0354886 | A1 | *  | 12/2014 | Michaeli  | H04N 1/4092|
|           |     |     |         |           | 348/607    |
| 2015/0146046 | A1 | *  | 5/2015  | Ogasahara | H04N 5/357 |
|           |     |     |         |           | 348/241    |
| 2015/0294186 | A1 | *  | 10/2015 | Ali       | G06K 9/40  |
|           |     |     |         |           | 382/199    |
| 2016/0301934 | A1 | *  | 10/2016 | Su        | H04N 19/30 |
| 2017/0365046 | A1 | *  | 12/2017 | Tezaur    | G06T 5/20  |

FOREIGN PATENT DOCUMENTS

JP    4618355 B2    1/2011

* cited by examiner

*Primary Examiner* — Anthony J Daniels
(74) *Attorney, Agent, or Firm* — Rossi, Kimms & McDowell LLP

(57) ABSTRACT

An image processing apparatus includes a processor that sharpens an input image on the basis a difference between a filter and a low pass filter, which are generated using of information regarding a point spread function of an optical system corresponding to an image pickup condition of the optical system, or a difference between an image obtained by applying the filter to an input image generated by imaging through the optical system and an image obtained by applying the low pass filter to the input image.

17 Claims, 9 Drawing Sheets

IMAGE PROCESSING APPARATUS, OPTICAL APPARATUS, IMAGE PROCESSING METHOD, AND NON-TRANSITORY COMPUTER-READABLE STORAGE MEDIUM

BACKGROUND OF THE INVENTION

Field of the Invention

The present invention relates an image processing apparatus, an optical apparatus, an image processing method, and a non-transitory computer-readable storage medium.

Description of the Related Art

Unsharp mask processing, in which differences between a blurred image and an input image are added to, or subtracted from, the input image to sharpen the input image, has been known. In Japanese Patent No. ("JP") 4618355, a method to reduce an influence of a Point Spread Function (PSF) of an optical system by applying an asymmetrical one-dimensional filter to a pixel signal row in an image height direction is proposed.

In the conventional unsharp mask processing using a rotationally symmetrical filter as the unsharp mask, it is difficult to sharpen an image that was deteriorated by a PSF having a complicated shape such as an asymmetrical aberration and a sagittal halo. That is, when an attempt to correct an aberration in an azimuth direction in which a large quantity of aberration occurs is performed, undershoot is generated in an azimuth direction in which a small quantity of aberration occurs, and an attempt to restrain the undershoot cannot fully correct the aberration.

The method disclosed in JP 4618355 considers only the asymmetry in the image height direction that is an azimuth direction of a meridional surface and, as the filter is one-dimensional, cannot improve the asymmetry in a direction other than the image height direction. Moreover, as the asymmetry of the filter adjusted by the number of minus tap coefficients is different from the blur caused by the PSF of the optical system, sufficient sharpening of the image is unavailable.

Further, in the conventional unsharp mask processing using a rotationally symmetrical filter, controlling a correction intensity is performed, but control of balance for each frequency is unconsidered. Thus, when the correction is strengthened to advance an effect of sharpening, noise on a high frequency side particularly increases, and when the correction is weakened, the problem of the noise is resolved, but the effect of the sharpening decreases.

SUMMARY OF THE INVENTION

In view of the problem, an object of the present invention is to provide an image processing apparatus, an optical apparatus, an image processing method, and a non-transitory computer-readable storage medium capable of performing excellent sharpening while minimizing an influence of noise.

An image processing apparatus according to one aspect of the present invention includes a processor that sharpens an input image on the basis a difference between a filter and a low pass filter, which are generated using information regarding a point spread function of an optical system corresponding to an image pickup condition of the optical system, or a difference between an image obtained by applying the filter to an input image generated by imaging through the optical system and an image obtained by applying the low pass filter to the input image.

An optical apparatus according to another aspect of the present invention includes an image pickup element that images an object image formed by an optical system, and an image processing apparatus including a processor that sharpens an input image on the basis a difference between a filter and a low pass filter, which are generated using information regarding a point spread function of an optical system corresponding to an image pickup condition of the optical system, or a difference between an image obtained by applying the filter to an input image generated by imaging using the image pickup element and an image obtained by applying the low pass filter to the input image.

An image processing method according to another aspect of the present invention includes the step of sharpening an input image on the basis a difference between a filter and a low pass filter, which are generated using information regarding a point spread function of an optical system corresponding to an image pickup condition of the optical system, or a difference between an image obtained by applying the filter to an input image generated by imaging through the optical system and an image obtained by applying the low pass filter to the input image.

Further features of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

Figure 1A:
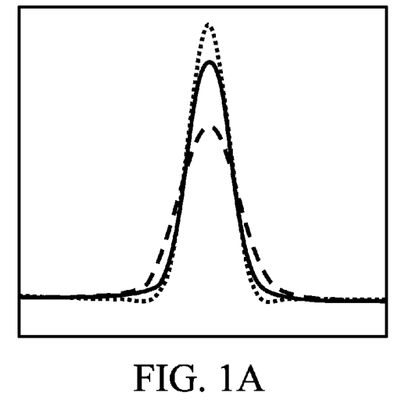
FIGS. 1A and 1B are schematic diagrams illustrating sharpening by unsharp mask processing.
Figure 1B:
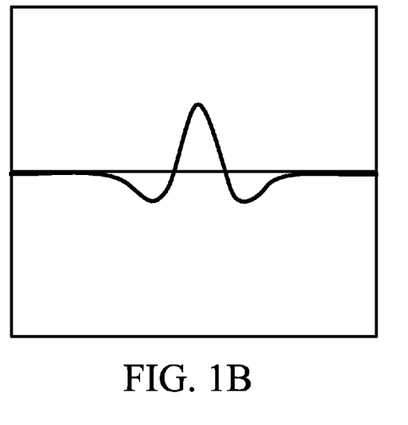

FIGS. 1A and 1B are schematic diagrams illustrating sharpening by unsharp mask processing (image sharpening processing). Of FIGS. 1A and 1B, an abscissa axis indicates coordinates, and an ordinate axis indicates a pixel value or a luminance value. In FIG. 1A, a solid line represents an input image, a broken line represents an image (blurred image) obtained by blurring the input image using an unsharp mask, and a dotted line represents an image after sharpening. FIG. 1B illustrates a correction component.

Assuming that f(x,y) is an input image and h(x,y) is a correction component, a sharpened image g(x,y) is expressed as the following Expression (1).

$$g(x,y)=f(x,y)+m \times h(x,y) \tag{1}$$

In Expression (1), m is an adjustment coefficient for changing a correction intensity, and changing the adjustment coefficient m can adjust a correction quantity. Herein, the adjustment coefficient m may be a constant irrespective of a position in the input image, or may be variable according to a position in the input image. Differentiating the adjustment coefficient m according to the position in the input image can adjust the correction quantity according to the position in the input image. Additionally, the adjustment coefficient m may be made different according to an image pickup condition such as a focal length, an aperture value, or an object distance of an optical system. Furthermore, in Expression (1), the second term is added to the first term, but this is used when the adjustment coefficient m is positive, and when the adjustment coefficient m is negative, the second term is subtracted from the first term.

Assuming that USM(x,y) is an unsharp mask, the correction component h(x,y) is expressed as the following Expression (2). The unsharp mask USM(x,y) is, for example, a tap value of the coordinate (x,y).

$$h(x,y)=f(x,y)-f(x,y)*USM(x,y) \tag{2}$$

By transforming a right side of Expression (2), the correction component h(x,y) is expressed as the following Expression (3).

$$h(x,y)=f(x,y)*(\delta(x,y)-USM(x,y)) \tag{3}$$

Herein, * represents a convolution, and δ represents a delta function (ideal point image). The delta function is data equal to the unsharp mask USM(x,y) in tap number, and has a center tap value of 1, and all other tap values of 0.

Hereinafter, generation of the correction component h(x, y) will be explained. In the general unsharp mask processing, as the unsharp mask, a smoothing filter such as a Gaussian filter, a median filter, and a moving average filter is used. For example, when the Gaussian filter is used as the unsharp mask USM for the input image f(x,y) represented by the solid line in FIG. 1A, the input image f(x,y) becomes the blurred image represented by the broken line in FIG. 1A. The correction component h(x,y) is a difference value between the input image f(x,y) and the blurred image as expressed in Expression (2), and is represented by the solid line in FIG. 1B obtained by subtracting the broken line in FIG. 1A from the solid line in FIG. 1A. By calculating Expression (1), the input image f(x,y) becomes the sharpened image g(x,y) represented by the dotted line in FIG. 1A.

Hereinafter, a description will be given of a method for sharpening an image by performing the unsharp mask processing for the input image deteriorated by an image pickup optical system to form an optical image of an object. The input image f(x,y) obtained via the image pickup optical system is expressed as the following Expression (4) where I(x,y) is a pre-captured image (object image) and psf(x,y) is the PSF representing a response to a point light source of the image pickup optical system.

$$f(x,y)=I(x,y)*psf(x,y) \tag{4}$$

As long as the image pickup optical system is a rotationally symmetrical coaxial optical system, the PSF corresponding to the center part in the image is rotationally symmetrical. Thus, the sharpening configured to make the input image f(x,y) close to the original image I(x,y) can be realized by applying the rotationally symmetrical unsharp mask USM(x,y) to the center part of the image. Since this correction component h(x,y) is a difference value between the input image f(x,y) and the blurred image, a filter having a shape closer to the PSF as the unsharp mask USM(x,y) can provide a more precise correction rather than a simple smoothing filter. For example, when the input image is deteriorated by a spherical aberration, the spherical aberration influences the input image rotationally symmetrically, but a smoothing filter such as a Gaussian filter has a distribution shape different from that of the PSF caused by the spherical aberration. Thus, even in reducing an influence blurring the input image rotationally symmetrically, using the PSF can correct the input image precisely.

In this embodiment, the PSF is used as the unsharp mask USM(x,y). The input image f(x,y) represented by the solid line in FIG. 1A has a symmetrical shape for simplification, but may have an asymmetrical shape. Even when the original image I(x,y) has an asymmetrical shape, sharpening using the rotationally symmetrical unsharp mask USM(x,y) is available as long as the deteriorated function of the original image I(x,y) corresponding to the psf(x,y) is rotationally symmetrical.

Figure 2A:
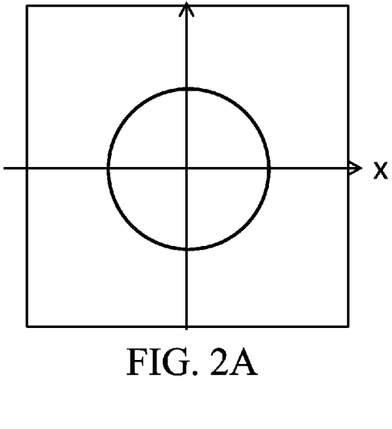
FIGS. 2A and 2B are schematic diagrams illustrating a PSF of an image pickup optical system.
Figure 2B:
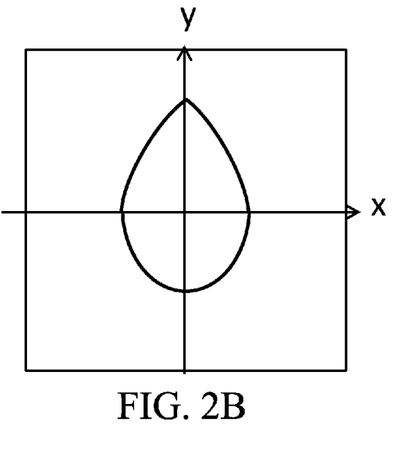

Even when the image pickup optical system is the rotationally symmetrical coaxial optical system, the PSF at a position in an image other than its center part usually has a rotationally asymmetrical shape. FIGS. 2A and 2B are schematic diagrams illustrating the PSF of the image optical system. FIG. 2A illustrates the on-axis PSF, and FIG. 2B illustrates the off-axis PSF. For example, assuming that the original image (object image) is an ideal point image, the input image f(x,y) is subject to the PSF of the optical system according to Expression (4). When there is an ideal point image in the angle of view corresponding to FIG. 2B and the original image (object image) is deteriorated due to the PSF of the image pickup optical system, an image obtained as the input image f(x,y) is blurred as illustrated in FIG. 2B.

Figure 3A:
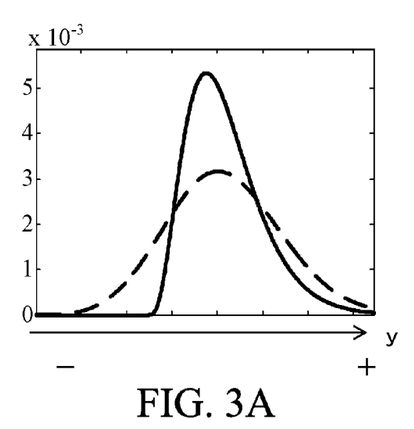
FIGS. 3A to 3C are schematic diagrams illustrating sharpening processing using a rotationally symmetrical unsharp mask.
Figure 3B:
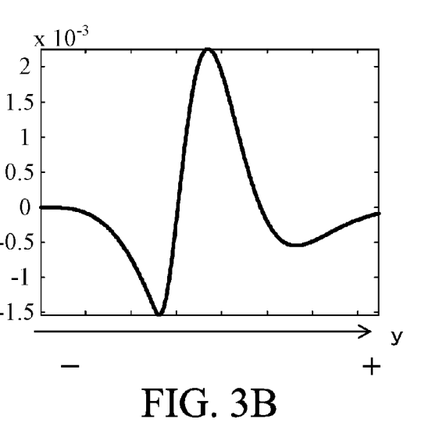
Figure 3C:
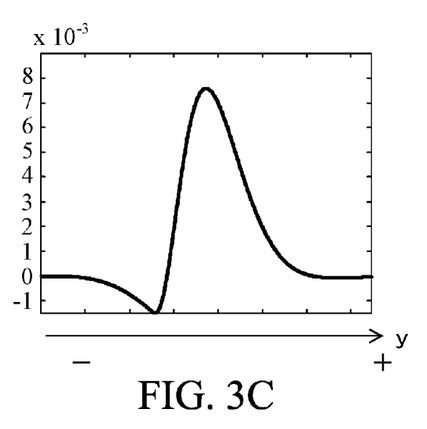
Figure 4A:
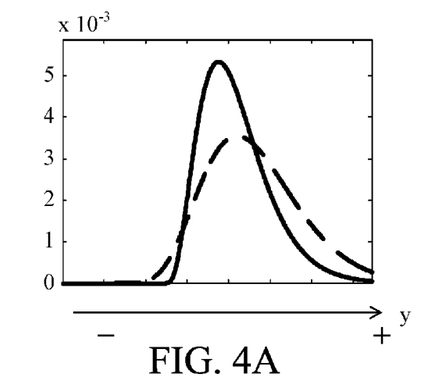
FIGS. 4A to 4C are schematic diagrams illustrating sharpening processing using a rotationally asymmetrical unsharp mask.
Figure 4B:
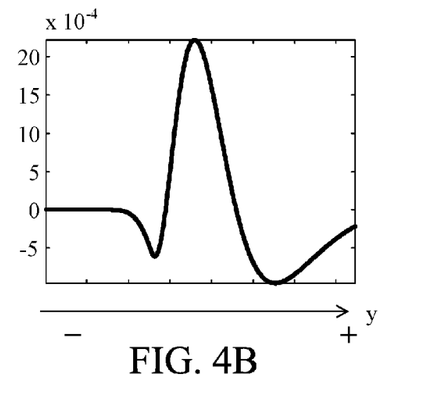
Figure 4C:
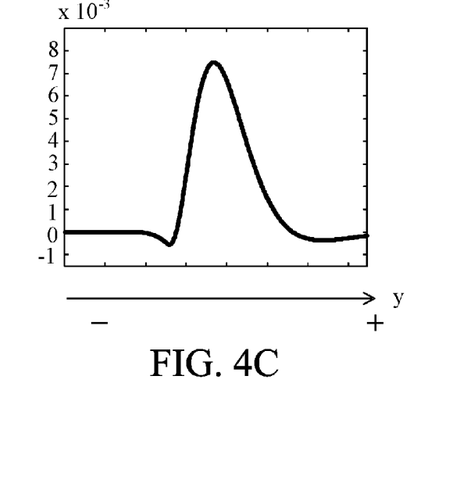

A description will now be given of sharpening by performing the unsharp mask processing for the rotationally asymmetrical blurred image. FIGS. 3A to 3C are schematic diagrams illustrating the sharpening using the Gaussian filter as the rotationally symmetrical unsharp mask for the asymmetrical deteriorated image. FIGS. 4A to 4C are schematic diagrams illustrating the sharpening using the PSF of the image pickup optical system as the rotationally asymmetrical unsharp mask for the asymmetrical deteriorated image. In FIGS. 3A and 4A, a solid line represents the input image, and a dotted line represents an image (blurred image) obtained by blurring the input image using the unsharp mask. FIGS. 3B and 4B illustrate a correction component that is a difference value between the input image and the blurred image. In FIGS. 3A to 3C and FIGS. 4A to 4C, an abscissa axis and an ordinate axis are similar to those in FIGS. 1A and 1B. In the blurred image illustrated in FIGS. 3A to 3C and FIGS. 4A to 4C, a blur is assumed to spread to the plus side in the abscissa axis.

In FIG. 3A, a difference value between the input image and the blurred image on the minus side of the peak position of the solid line is larger than a difference value between the input image and the blurred image on the plus side. Thus, as illustrated in FIG. 3B, an extreme value of the correction component on the minus side of the peak position is smaller than that on the plus side. That is, as the correction component on the plus side and the correction component on the minus side are respectively small and large, performing the unsharp mask processing using Expression (1) cannot correct a rotationally asymmetrical blur. FIG. 3C illustrates the sharpened image where the adjustment coefficient m is 1. The sharpened image is, as illustrated in FIG. 3C, is sharpened compared to the input image represented by the solid line in FIG. 3A, but an area on the minus side is largely recessed compared to an area on the plus side, and the asymmetrical blur is not corrected. Additionally, setting the adjustment coefficient m to sufficiently correct the area on the plus side in the input image makes the area on the minus side in the input image the overcorrection (undershoot). Setting the adjustment coefficient m to sufficiently correct the area on the minus side in the input image makes the area on the plus side in the input image the correction shortage.

As mentioned above, when the unsharp mask processing for the asymmetrically blurred input image is performed using the rotationally symmetrical unsharp mask, the improvement of the asymmetry and the sharpening of the input image are difficult. Using the rotationally symmetrical filter other than the Gaussian filter also causes such a problem.

In FIG. 4A, a difference value between the input image and the blurred image on the plus side of the peak position of the solid line is larger than a difference value between the input image and the blurred image on the minus side. Thus, as illustrated in FIG. 4B, an extreme value of the correction component on the plus side of the peak position is smaller than that on the minus side. That is, the correction component on the plus side, which has a large blur quantity, becomes larger and the correction component on the minus side, which has a small blur quantity, becomes small. Accordingly, when the unsharp mask processing for the input image represented by the solid line in FIG. 4A is performed, a tendency of balance of the blur in the input image corresponds to that of the correction quantity of the correction component, and thus the overcorrection and correction shortage are less likely to occur. FIG. 4C illustrates the sharpened image where the adjustment coefficient m is 1. The sharpened image is, as illustrated in FIG. 4C, is sharpened compared to the input image represented by the solid line in FIG. 4A, and a balance difference between a recess of the area on the minus side and a recess of the area on the plus side is improved compared to the sharpened image in FIG. 3C. Moreover, as the overcorrection is less likely to occur than a case where the rotationally symmetrical unsharp mask is used, the value of the adjustment coefficient m can be comparatively largely set. Hence, the asymmetrical blur is reduced, and thus the sharpened image is further sharpened. Furthermore, as balance of the correction quantity of the correction component is determined based on the difference between the input image and the blurred image, the unsharp mask needs to more blur a more blurred part by the PSF of the image pickup optical system to perform the unsharp mask processing more precisely. Thus, using the PSF of the image pickup optical system as the unsharp mask can perform the unsharp mask processing more precisely.

Hereinafter, a description will be given of control of the frequency characteristics in the unsharp mask processing. When the Fourier transform is performed for Expression (1) to be transformed to a display format on a frequency plane, Expression (1) is expressed as the following Expression (5).

$$G(u,v)=F(u,v)+m \times H(u,v) \quad (5)$$

H(u,v) is Fourier transformation of the correction component h(x,y), G(u,v) and F(u,v) are respectively Fourier transformation of the sharpened image g(x,y) and Fourier transformation of the input image f(x,y). (u,v) is a coordinate on a two-dimensional frequency plane, that is a frequency.

When the Fourier transform is performed for Expression (2), the Fourier transformation H(u,v) of the correction component h(x,y) is expressed as the following Expression (6).

$$H(u,v)=F(u,v)-F(u,v) \times U(u,v) \quad (6)$$

U(u,v) is Fourier transformation of the unsharp mask USM(x,y). Besides, when the Fourier transform is performed for Expression (3), the Fourier transformation H(u,v) of the correction component h(x,y) is expressed as the following Expression (7).

$$H(u,v)=F(u,v) \times (1-U(u,v)) \quad (7)$$

When Expression (6) is substituted into Expression (5), the Fourier transformation G(u,v) of the sharpened image g(x,y) is expressed as the following Expression (8).

$$G(u,v)=F(u,v)+m \times \{F(u,v)-F(u,v) \times U(u,v)\} \quad (8)$$

Additionally, when Expression (7) is substituted into Expression (5), the Fourier transformation G(u,v) of the sharpened image g(x,y) is expressed as the following Expression (9).

$$G(u,v)=F(u,v)+m \times F(u,v) \times \{1-U(u,v)\} \quad (9)$$

Expression (9) is transformed into the following Expression (10).

$$G(u,v)=F(u,v) \times \{1+m \times (1-U(u,v))\} \quad (10)$$

Expressions (8) to (10) are performed in different orders, but can be derived by transformation of mathematical expression, and thus are equivalent to each other. A brace { } in Expression (10) corresponds to a change of frequency characteristics before and after the unsharp mask processing. That is, an absolute value of the brace { } in Expression (10) is a gain (degree of sharpening) of the filter used for the unsharp mask processing, and expresses an effect of the sharpening in a frequency space of the unsharp mask processing.

Figure 5:
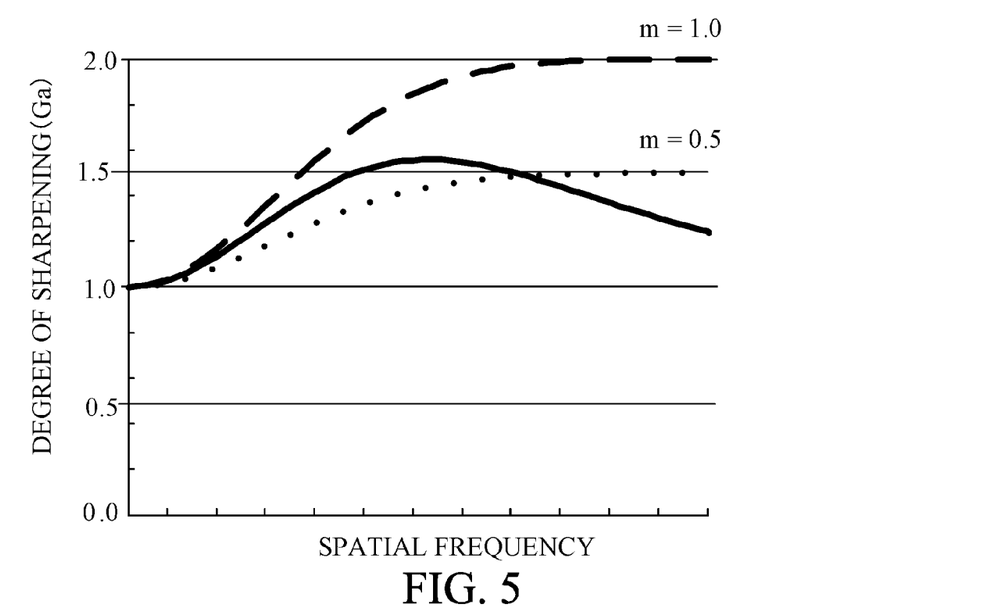
FIG. 5 is a diagram illustrating a gain of the unsharp mask processing.

FIG. 5 is a diagram illustrating the absolute value of the brace { } in Expression (10), and an abscissa axis and an ordinate axis are respectively a space frequency and a gain. In FIG. 5, a dotted line represents a case where the adjust coefficient m is 0.5, and a gain Ga asymptotically approaches 1.5 on a high frequency side. A broken line represents a case where the adjust coefficient m is 1.0, and a gain Ga asymptotically approaches 2.0 on a high frequency side. Assuming that Re(U(x,y)) and Im(U(x,y)) are respectively a real part and an imaginary part of the Fourier transformation U(u,v) of the unsharp mask USM(x,y), the gain Ga in the unsharp mask processing is expressed as the following Expression (11).

$$Ga(u,v)=\sqrt{(1+m-m Re(U(u,v)))^2+m^2 Im(U(u,v))^2} \quad (11)$$

Supposedly, when the unsharp mask USM(x,y) is rotationally symmetrical Gaussian distribution, the function U(u,v) also becomes Gaussian distribution. Thus, as the imaginary part Im(U(u,v)) is 0 and the real part Re(U(u,v)) satisfies 0≤Re(U(u,v))≤1, the gain Ga satisfies 1≤Ga≤1+m. Moreover, as Gaussian distribution asymptotically approaches 0 at greater distances from a center part of distribution, the real part Re(U(u,v)) also comes close to 0. Hence, the gain Ga asymptotically approaches (1+m) toward the high frequency side, and becomes a curved line such as the dotted line and the broken line in FIG. 5.

Figure 6:
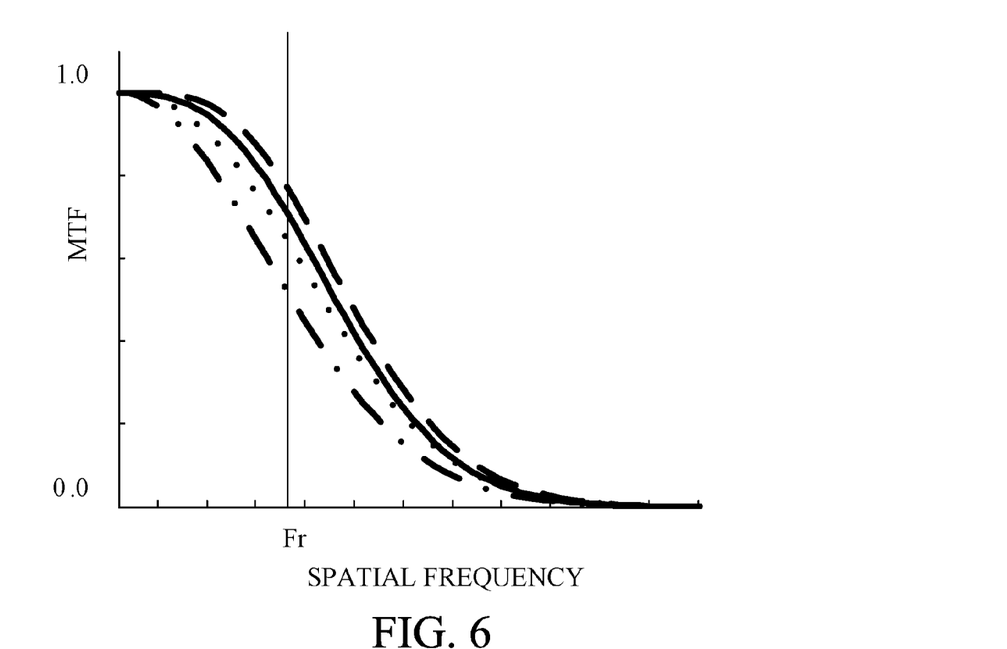
FIG. 6 is a diagram illustrating a change of an amplitude component before and after the sharpening by the unsharp mask processing.

Hereinafter, the description will be given of using the PSF of the image pickup optical system as the unsharp mask USM(x,y). In this case, the Fourier transformation U(u,v) of the unsharp mask USM(x,y) becomes an Optical Transfer Function (OTF) that is Fourier transformation of the PSF. An absolute value of the OTF, that is, an amplitude component is a Modulation Transfer Function (MTF). FIG. 6 is a diagram illustrating a change of an amplitude component MTF before and after the sharpening by the unsharp mask processing. In FIG. 6, a dashed line represents the amplitude component MTF before the sharpening, and a dotted line and a broken line respectively represent the amplitude component MTF after the sharpening corresponding to the dotted line and the broken line in FIG. 5.

The amplitude component MTF has frequency characteristics of an amplitude component of image deterioration due to an aberration and, as illustrated in FIG. 6, becomes high on a low frequency side and low on a high frequency side. When the amplitude component MTF approaches 0, a real part and an imaginary part of the OTF come close to 0, and when the amplitude component MTF exceeds a frequency that the image pickup optical system can resolve, the real part and the imaginary part become 0. Then, the gain Ga becomes (1+m) by Expression (11), and thus becomes a curved line such as the dotted line and the broken lint in FIG. 5 that increases on the high frequency side even when the PSF of the image pickup optical system is used as the unsharp mask USM(x,y). Herein, the off-axis PSF is rotationally asymmetric, and thus the gain Ga is also rotationally asymmetric. The gain Ga is constant in any direction (section) when the PSF is rotationally symmetric, but differs depending on a direction when the PSF is rotationally asymmetric. In addition, the real part and the imaginary part of the OTF may become minus, and thus the gain Ga may become Ga>(1+m) at a predetermined frequency.

As mentioned above, even when the rotationally symmetrical filter such as Gaussian distribution, or the PSF of the image pickup optical system is used as the unsharp mask USM(x,y), the gain Ga becomes a curve that increases from the low frequency side to the high frequency side. As illustrated in FIG. 5, when the adjustment coefficient m is different, differences of the gain Ga are caused at the high frequency side, but a difference between the amplitude components MTF after the sharpening becomes a maximum at a frequency fr. This is because the amplitude component MTF after the sharpening is calculated by multiplying the amplitude component MTF before the sharpening represented by the dashed line in FIG. 6 and the gain Ga illustrated in FIG. 5. When the amplitude component MTF before the sharpening is low, a change of the amplitude component due to the sharpening becomes small regardless the large gain Ga.

When the dotted line and the broken line in FIG. 5 are compared, the dashed line is above the dotted line, and thus has a large effect of the sharpening compared to the dotted line, but as a noise component is included in the input image being processed by the unsharp mask processing, an influence of the noise component must be considered actually. When the noise component of the input image is considered, Expression (10) is expressed as the following Expression (12).

$$G(u,v) = (F(u,V) + N(u,v)) \times \{+m \times (1 - U(u,v))\} \quad (12)$$

N(u,v) is a noise component. When the unsharp mask processing for the input image including the noise component is performed on the basis of Expression (12), a part of the brace { } is applied to both of the Fourier transformation F(u,v) of the input image f(x,y) and the noise component N(u,v). Additionally, when the Fourier transformation is performed for Expression (4), the Fourier transformation F(u,v) of the input image f(x,y) is obtained, and is a product of the Fourier transformation of the original image I(x,y) before capturing and the OTF of the image pickup optical system. On the high frequency side where the amplitude component MTF comes close to 0, since the real part and the imaginary part of the OTF approaches 0 as previously explained, the Fourier transformation of the input image f(x,y) also approaches 0. Meanwhile, when being a noise component such as a white noise, the noise component N(u,v) is basically in uniform distribution without depending on the frequency. Accordingly, on the high frequency side, as a ration of the noise component N(u,v) to the Fourier transformation F(u,v) of the input image f(x,y) becomes large, applying a high gain on the high frequency side in the input image including the noise component amplifies the noise component compared to the effect of the sharpening. Hence, to obtain an image having good quality as an image for appreciation, the gain on the high frequency side, which amplifies the noise component compared to the effect of the sharpening, should be made as small as possible.

Moreover, in the unsharp mask processing, as described above, changing the adjustment coefficient m can control the gain Ga. However, adjusting the correction quantity using the adjustment coefficient m can control the correction quantity for each spatial frequency uniformly, but cannot make the correction quantity on the low frequency side large and the correction quantity on the high frequency low as represented by the solid line in FIG. 5.

In this embodiment, to obtain an image having good quality as an image for appreciation, the gain on the high frequency side, which has a large influence on the noise component compared to the effect of the sharpening, is made small, and the gain on the small frequency side, which has a small influence on the noise component, is made large. To realize such processing by the unsharp mask processing, the delta function δ(x,y) in Expressions (2) and (3) is replaced by a low pass filter LPF(x,y). Then, the correction component h(x,y) is expressed as the following Expressions (13) and (14)

$$h(x,y) = f(x,y) * LPF(x,y) - f(x,y) * USM(x,y) \quad (13)$$

$$h(x,y) = f(x,y) * (LPF(x,y) - USM(x,y)) \quad (14)$$

In this embodiment, using the low pass filter LPF(x,y) and the unsharp mask USM(x,y) can realize balance control of the frequency characteristics in the unsharp mask processing.

Assuming that L(u,v) is Fourier transformation of the low pass filter LPF(x,y), the Fourier transformation of the sharpened image g(x,y) is expressed as the following Expression (15).

$$G(u,v) = F(u,v) \times \{1 + m \times (L(u,v) - U(u,v))\} \quad (15)$$

Assuming that Re(L(x,y)) and Im(L(x,y)) are respectively a real part and an imaginary part of the Fourier transformation L(u,v) of the low pass filter LPF(x,y), the gain Ga in Expression (15) is expressed as the following Expression (16).

$$Ga(u,v) = \sqrt{\begin{array}{c}(1 + m\ \text{Re}(L(u,v)) - m\ \text{Re}(U(u,v)))^2 + \\ m^2(\text{Im}(L(u,v)) - \text{Im}(U(u,v)))^2\end{array}} \quad (16)$$

Similarly, from Expressions (8) and (9), performing the Fourier transform for the low pass filter LPF(x,y) replaced from the delta function δ(x,y) can derive an expression corresponding to balance control of the frequency characteristics.

The amplitude component MTF after processing the unsharp mask processing based on Expression (15) is represented by the solid line in FIG. 6, and the gain Ga based on Expression (16) is represented by the solid line in FIG. 5.

Figure 7:
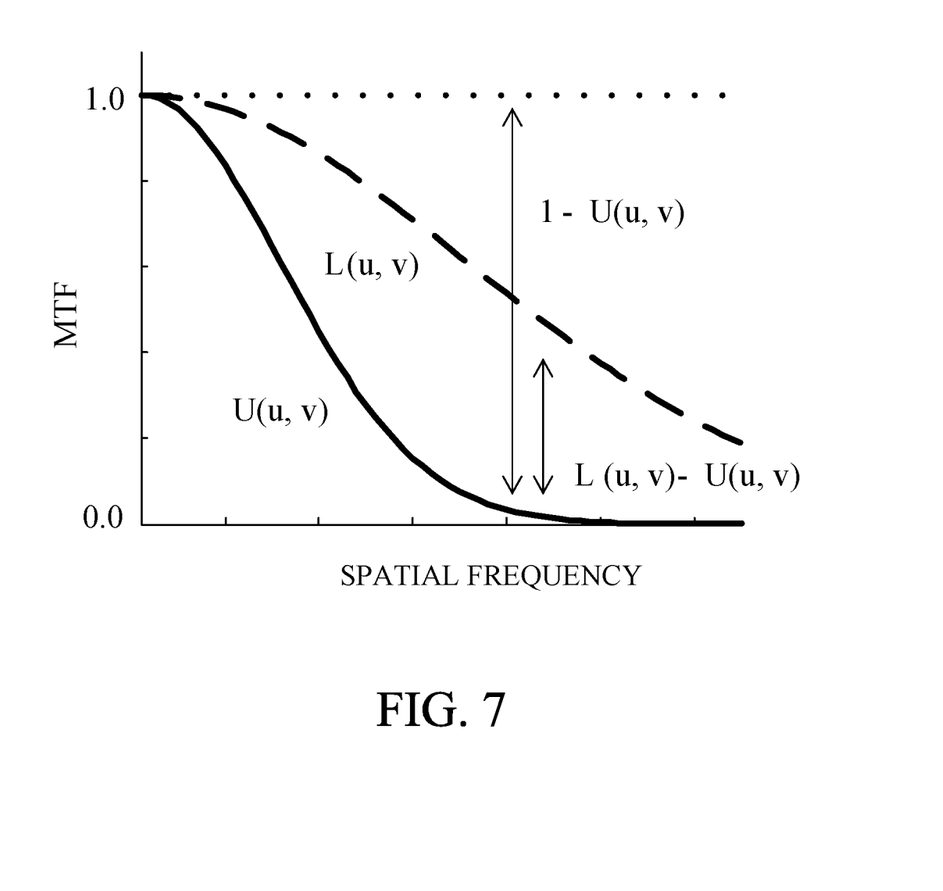
FIG. 7 is an explanatory diagram to explain frequency characteristics of a correction component.

FIG. 7 is a relation diagram between the Fourier transformation L(u,v) of the low pass filter LPF(x,y) and the Fourier transformation U(u,v) of the unsharp mask USM(x,y). In FIG. 7, a broken line represents the Fourier transformation L(u,v) of the low pass filter LPF(x,y), and a solid line represents the Fourier transformation U(u,v) of the unsharp mask USM(x,y). As illustrated in FIG. 7, the Fourier transformation L(u,v) of the low pass filter LPF(x,y) and the Fourier transformation U(u,v) of the unsharp mask USM(x,y) always have a relation of L(u,v)>U(u,v). By satisfying such a relation, performing the unsharp mask processing can obtain the effect of the sharpening at an arbitrary frequency. When the unsharp mask USM(x,y) and the low pass filter LPF(x,y) are rotationally symmetrical like Gaussian distribution, making dispersion of the low pass filter LPF(x,y) smaller than dispersion of the unsharp mask USM(x,y) can satisfy the above relation.

In the unsharp mask processing based on Expressions (8) to (10), (1−U(u,v)) becomes large on the high frequency side as illustrated in FIG. 7, and the gain Ga converges on (1+m) on the high frequency side as represented by the broken line and the dotted line in FIG. 5. Meanwhile, in the unsharp mask processing based on Expression (14), a difference (L(u,v)−U(u,v)) between the Fourier transformations becomes small on the high frequency side as illustrated in FIG. 7, and the gain Ga is restrained on the high frequency side as represented by the solid line in FIG. 5. Additionally, in FIG. 6, the solid line has the large effect of the sharpening on the low frequency side compared to the dotted line and the broken line, and approaches the dotted line on the high frequency side to restrain the gain.

As mentioned above, using the low pass filter LPF(x,y) and the unsharp mask USM(x,y) can perform adjustment of balance of the gain on the high frequency side and the gain on the low frequency side, which has not been realized. Adjusting balance of the gain on the high frequency side and the gain on the low frequency side can prevent applying the large gain on the high frequency and can realize both reduction of the noise and the sharpening of the image. Preventing applying the large gain on the high frequency side can reduce not only the influence of the noise component but also, for example, the influence of another harmful effects due to sharpening processing such as darkening caused by sharpening an image including a luminance saturation part.

Herein, the Fourier transformation L(u,v) of the low pass filter LPF(x,y) and the Fourier transformation U(u,v) of the unsharp mask USM(x,y) need not necessarily satisfy a relation of L(u,v)>U(u,v). When a relation of L(u,v)<U(u,v) is satisfied at an arbitrary frequency, blurring processing, not the sharpening, is performed at the frequency, but is effective, for example, in loosening a slope of a MTF curve or converging on predetermined MTF characteristics.

Next, a description will be given of fundamental expressions of the unsharp mask processing used in each example. In a third example, the sharpening is performed using the following Expression (17) derived from Expressions (1) and (12).

$$g(x,y)=f(x,y)+m\times\{f(x,y)*LPF(x,y)-f(x,y)*USM(x,y)\} \quad (17)$$

In a second example, the sharpening is performed using the following Expression (18) derived from Expressions (1) and (13).

$$g(x,y)=f(x,y)+m\times f(x,y)*\{LPF(x,y)-USM(x,y)\} \quad (18)$$

In a first example, the sharpening is performed using the following Expression (19) obtained by transforming Expression (18).

$$g(x,y)=f(x,y)*\{\delta(x,y)+m\times(LPF(x,y)-USM(x,y))\} \quad (19)$$

The PSF is different for each an image pickup condition such as an image height of an image formed via an optical system, and a focal length, a F-number and an object distance of the optical system. In the following examples, the image height as one example of the image pickup condition is used, but the unsharp mask may be generated on the basis of aberration information different depending on a focal length, a F-number and an image pickup distance of the object system.

First Example

Figure 8:
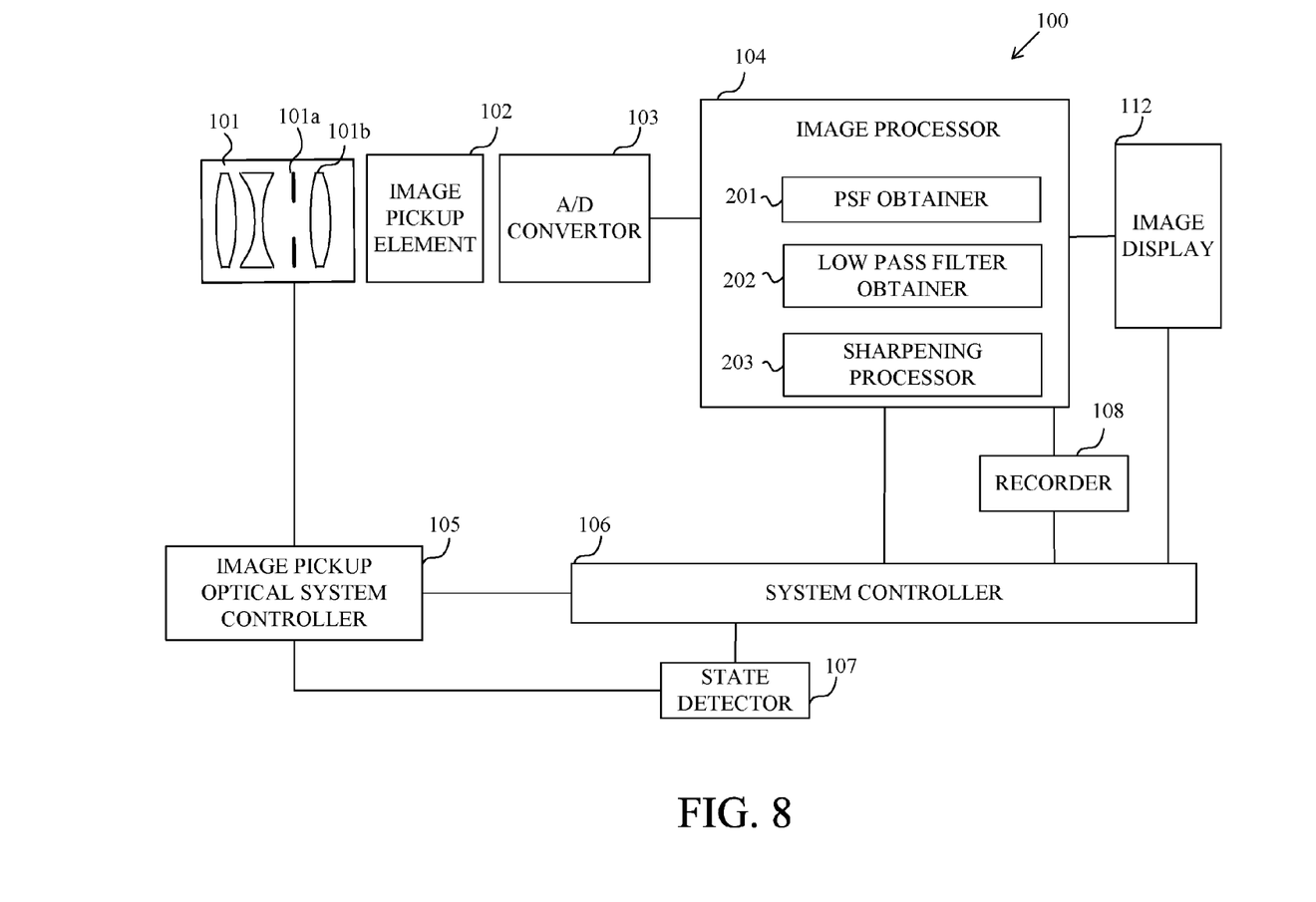
FIG. 8 is a block diagram illustrating an image pickup apparatus according to an embodiment of the present invention (first, second and third examples).

FIG. 8 is a block diagram illustrating an image pickup apparatus (optical apparatus) 100 according to this example. The image pickup apparatus 100 include an image pickup optical system 101 and an image pickup apparatus body (camera body). The image pickup optical system 101 includes an aperture 101a and a focus lens 101b, and is integrally configured with the image pickup apparatus body. The image pickup optical system 101 may be detachably attached to the image pickup apparatus body. Into the image pickup optical system 101, an optical element such as a low pass filter and an infrared cut filter may be inserted. When an optical element, such as a low pass filter, which influences on characteristics of a PTF, is used, generating the unsharp mask in consideration of the influence of the inserted optical element can perform the unsharp mask processing precisely. Additionally, as the infrared cut filter influences on each PSF of RGB channels (RGB color components), which is an integral value of a PSF of a spectral wavelength, especially the PSF of the R channel, and thus an influence of the infrared cut filter is preferably considered in generating the unsharp mask.

An image pickup element 102 is a two-dimensional image pickup element such as a Charge Coupled Device (CCD) or a Complementary Metal-Oxide Semiconductor (CMOS). The image pickup element 102 generates a captured image by photoelectrically converting an object image (imaging light) obtained through the image pickup optical system 101. An A/D convertor 103 converts an analog signal (electrical signal), which is output from the image pickup element 102, into a digital signal, and outputs the digital signal to an image processor (image processing apparatus) 104.

The image processor 104 performs predetermined processing and the unsharp mask processing to the digital signal obtained from the A/D convertor 103. Image processing executed by the image processor 104 is performed according to an image processing program as a computer program, which operates on a software and a hardware. In this example, the image processor 104 performs the unsharp mask processing, but a personal computer (PC) or a dedicated apparatus may perform the unsharp mask processing as the image processing apparatus. The unsharp mask processing may be also performed by operating a circuit provided to correspond to the program for the unsharp mask processing.

The image processor 104 obtains information regarding an image pickup condition (image pickup condition information) of the image pickup apparatus 100 from a state detector 107. The image pickup condition information is information regarding an aperture, a photographing distance, or a focal length of a zoom lens. The state detector 107 may obtain the image pickup condition information from a system controller 106 or an image pickup optical system controller 105.

The image processor 104 includes a PSF obtainer (point spread function obtainer) 201, a low pass filter obtainer 202 and a sharpening processor 203. When the image processing apparatus to perform the unsharp mask processing is provided separately from the image processor 104, the system controller 106 may store aberration information corresponding to the captured image. In this case, the image processing apparatus includes only the sharpening processor 203, and need not include the PSF obtainer 201 and the low pass filter obtainer 202.

A recorder 108 includes a ROM and a hard disk drive, and stores the image output from the image processor 104 in a predetermined format. The recorder 108 also stores a relation between the image pickup condition of the image pickup optical system 101 and the PSF of the image pickup optical system 101.

The recorder 108 further installs the image processing program executed by the image processor 104. When the image processing apparatus to perform the unsharp mask processing is provided separately from the image processor 104, the image processing program may be installed in the image processing apparatus. The image processing program may be also stored in, for example, a non-transitory computer-readable storage medium.

An image display 112 displays an image obtained by performing a predetermined processing for display after the unsharp mask processing. On the image display 112, an image obtained by performing simple processing for quickly display may be displayed.

The system controller 106 is configured as a microcomputer and a CPU (processor), and control a serious of processing in the image pickup apparatus 100 as previously mentioned. The image pickup optical system controller 105 controls mechanical driving of the image pickup optical system 101 on the basis of instructions of the system controller 106.

Figure 9:
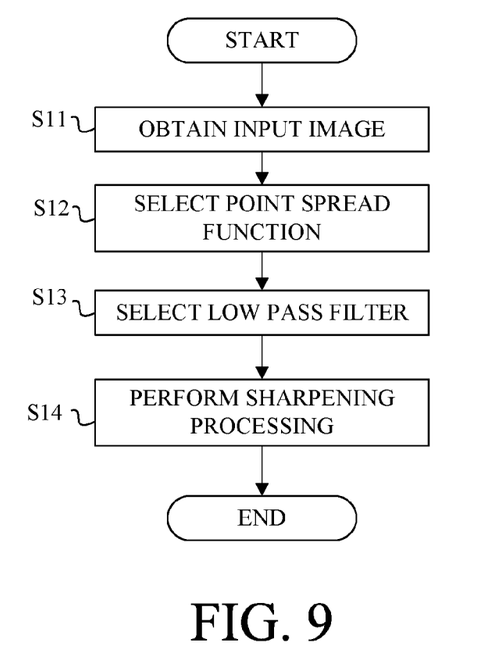
FIG. 9 is a flowchart illustrating an image processing method (first, second and third examples).

Hereinafter, with reference to FIG. 9, an image processing method according to this example will be explained. FIG. 9 is a flowchart the image processing method according to this example, and "S" represents "a step (process)". The flowchart of FIG. 9 can be embodied as a program (image processing program) to enable a computer to execute a function at each step. The same can be said about flowcharts according to other examples. Each step of FIG. 9 is executed by the image processor 104 on the basis of instructions from the system controller 106.

Figure 10:
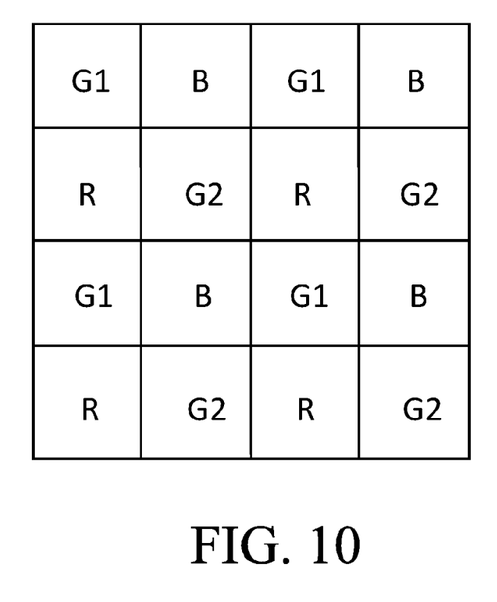
FIG. 10 is a schematic diagram illustrating a Bayer arrangement.

At step S11, the image processor 104 obtains a captured image as an input image. Color component date, which is used as the input image and is a correction target, is, for example, image date of a G channel after demosaicing. However, image data of a R channel or a B channel, image data of all RGB channels, or image data before demosaicing may be used. FIG. 10 is a schematic diagram illustrating a Bayer arrangement, which is a discrete ordered array. For example, image data for each color may be used as the input image after simply extracting data of each channel of RGB channels, or only image data of a specific channel may be used as the input image. Moreover, as illustrated in FIG. 10, the G channel may be divided into two channels G1 and G2 to use as four channels. By dividing the G channel into two, image data of the respective channels R, G1, G2, and B have equal resolutions, and thus the transaction and data processing become easy.

At step S12, the PSF obtainer 201 obtains the PSF of the image pickup optical system 101 corresponding to the image pickup condition of the input image from the recorder 108. The PSF obtained by the PSF obtainer 201 may be two-dimensional tap data, a plurality of pieces of one-dimensional data each being a component of the PSF, or a coefficient. The two-dimensional tap data is divided into a plurality of pieces of one-dimensional data using, for example, a singular value decomposition theorem. The recorder 108 records divided data, and the PSF obtainer 201 may obtains the plurality of pieces of one-dimensional data corresponding to a main component of the PSF according to the image pickup condition. In this example, the PSF is used as the unsharp mask USM(x,y).

At step S13, the low pass filter obtainer 202 obtains the low pass filter LPF(x,y) from the recorder 108. The low pass filter LPF(x,y) obtained by the low pass filter obtainer 202 uses common rotationally symmetrical distribution regardless of an image height, and performs convolution processing for the input image as with the unsharp mask USM(x,y). As the low pass filter LPF(x,y), a smoothing filter such as a Gaussian filter may be used, or a two-dimensional filter, which is reconstructed from a plurality of pieces of one-dimensional tap data and a coefficient becoming a component, may be used. Additionally, the low pass filter LPF(x,y) may be also generated to be constant with respect to the image pickup condition of the image pickup apparatus 100 for reduction of a data quantity, or may be generated to be different according to the image pickup condition for enhancement of correction precision.

Figure 11A:
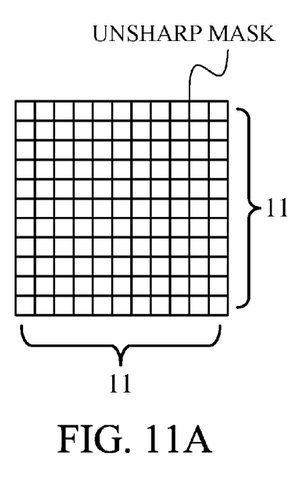
FIGS. 11A and 11B are schematic diagrams illustrating the unsharp mask and a schematic sectional diagram.

Hereinafter, referring to FIGS. 11A and 11B, a description will now be given of the unsharp mask USM(x,y) and the low pass filter (x,y). The tap number of the unsharp mask USM(x,y) and the low pass filter LPF(x,y) is determined based on the aberrational characteristics of the image pickup lens 101 and the required sharpening precision. FIG. 11A illustrates a two-dimensional mask of 11×11 taps as one example of the unsharp mask USM(x,y) and the low pass filter LPF(x,y). The number of the unsharp mask USM(x,y) needs not necessarily be equal to that of the low pass filter LPF(x,y). For example, as the low pass filter LPF(x,y) has a small spread of distribution compared to the unsharp mask USM(x,y), the number of the low pass filter LPF(x,y) may be reduced to decrease a processing load and a data quantity.

Figure 11B:
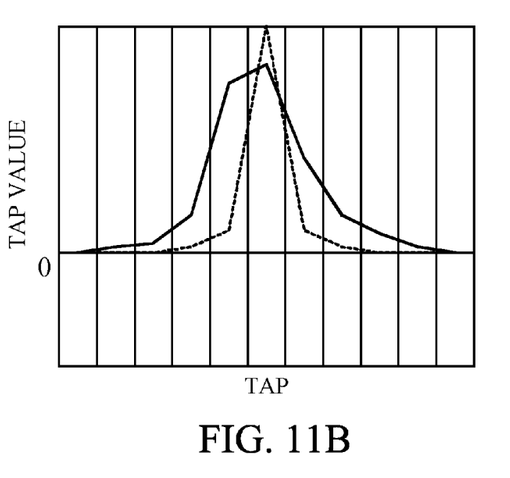

FIG. 11B illustrates sectional diagrams illustrating the unsharp mask USM(x,y) and the low pass filter LPF(x,y) of FIG. 11A. An abscissa axis indicates a tap, and an ordinate axis indicates a tap value. In FIG. 11B, a solid line represents a sectional diagram of the unsharp mask USM(x,y), and a dotted line represents a sectional diagram of the low pass filter LPF(x,y). As distribution of a value (coefficient value) of each tap, distribution of signal values (the PSF of the image pickup optical system) spread by aberrations is idealized. Moreover, the unsharp mask USM(x,y) may be generated on the basis of information regarding the PSF, or the two-dimensional PSF obtained by the PSF obtainer 201 may be directly used as the unsharp mask USM(x,y).

At step S14, the sharpening processor 203 performs the unsharp mask processing for the input image using the unsharp mask USM(x,y) and the low pass filter LPF(x,y). In this example, balance control of frequency characteristics is performed using the low pass filter LPF(x,y).

When the difference (L(u,v)−U(u,v)) between Fourier transformations as illustrated in FIG. 7 is negative, the amplitude component MTF after the sharpening decreases and thus, in this example, the low pass filter LPF(x,y), which makes the difference (L(u,v)−U(u,v)) between Fourier transformations positive, is used. To make the difference (L(u,v)−U(u,v)) between Fourier transformations positive, a relation of L(u,v)>u(u,v) should be satisfied. Thus, a function or a filter having a small spread of distribution compared to the unsharp mask USM(x,y) as illustrated in FIG. 11B may be used for the low pass filter LPF(x,y). When distribution of the low pass filter LPF(x,y) approaches the delta function $\delta(x,y)$ by making its spread small, the value of the Fourier transformation L(u,v) of the low pass filter LPF(x,y) increases, and thus the difference (L(u,v)−U(u,v)) between the Fourier transformations does not be negative. Moreover, when the low pass filter LPF(x,y) changes to the delta function $\delta(x,y)$ to obtain the effect of the sharpening, the amplitude component MTF of the low pass filter LPF(x,y) becomes 1 at all frequencies as represented by the dotted line in FIG. 7. As previously explained, on the high frequency side where the amplitude component MTF is low, the influence of the noise to the effect of the sharpening increases. Thus, in this example, the low pass filter LPF(x,y), in which the spread is formed to reduce the influence of the noise on the high frequency side and the difference of the Fourier transformations (L(u,v)−U(u,v)) does not become negative, is generated and is used.

As the adjustment coefficient m is also a parameter to influence the correction quantity, the gain Ga of the unsharp mask becomes larger when the adjustment coefficient m increases and becomes smaller when the adjustment coefficient m decreases. As represented by the dotted line and the broken line in FIG. 5, the correction quantity to the frequency totally changes when the adjustment coefficient m is changed, and thus, in this example, balance of the frequency characteristics on the high frequency side and the low frequency side is adjusted by the spread of the low pass filter LPF(x,y) and total control is performed by the adjustment coefficient m.

As the effect of the sharpening is produced when the amplitude component MTF of the image pickup optical system 101 on the high frequency side substantially remains, the low pass filter LPF(x,y) may be changed to the delta function $\delta(x,y)$. Furthermore, the low pass filter LPF(x,y) having the spread corresponding to the amplitude component MTF of the image pickup optical system 101 and the delta function $\delta(x,y)$ may be used while switching.

Additionally, in this example, rotationally symmetrical distribution is used for the low pass filter LPF(x,y), but rotationally asymmetrical distribution may be used. For example, the PSF used as the unsharp mask USM(x,y) can be proportionally reduced, and the low pass filter LPF(x,y) can be also changed according to the PSF.

Performing the unsharp mask processing using the unsharp mask USM(x,y) and the low pass filter (x,y) as described above can realize the sharpening processing capable of obtaining desired frequency characteristics after execution of the processing.

In this example, calculating Expression (19) using the unsharp mask USM(x,y) and the low pass filter LPF(x,y) performs the sharpening. A part in brace { } of Expression (19) is called a sharpening filter conveniently. In this example, as represented in Expression (19), the input image is sharpened using the difference value between the unsharp mask USM(x,y) and the low pass filter LPF(x,y) generated on the basis of information of the PSF. The adjustment coefficient m is determined in consideration of the noise of the image, and the overcorrection and the correction shortage of the sharpening.

The sharpening filter is generated by the unsharp mask USM(x,y) and the low pass filter LPF(x,y), but as the PSF changes according to the image height, the unsharp mask USM(x,y) is preferably changed depending on the image height to improve correction precision. However, when the memory 108 records the PSF at minute intervals of the image height, data capacity increases and thus cost increases. Hence, in this example, to change the PSF according to the image height, the input image is divided into the plurality of areas, and the sharpening filter corresponding to a medium is generated by performing interpolation processing for each area using information of the PSF regarding image heights at least two points.

Figure 12:
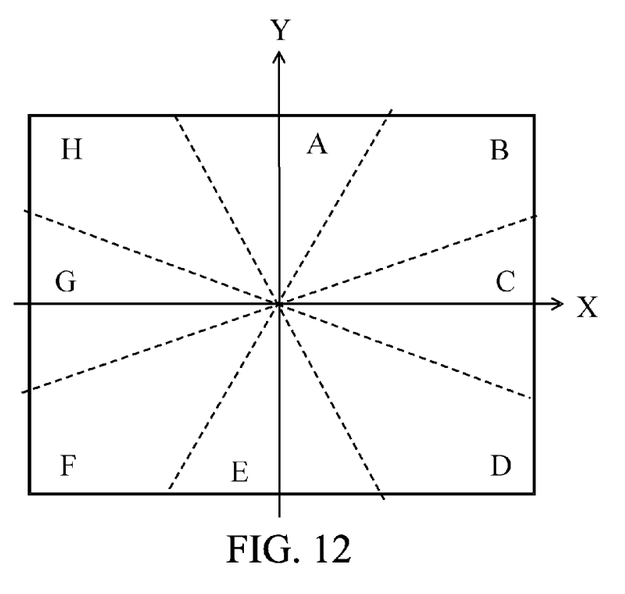
FIG. 12 is an explanatory diagram to explain a dividing method of an input image.
Figure 13:
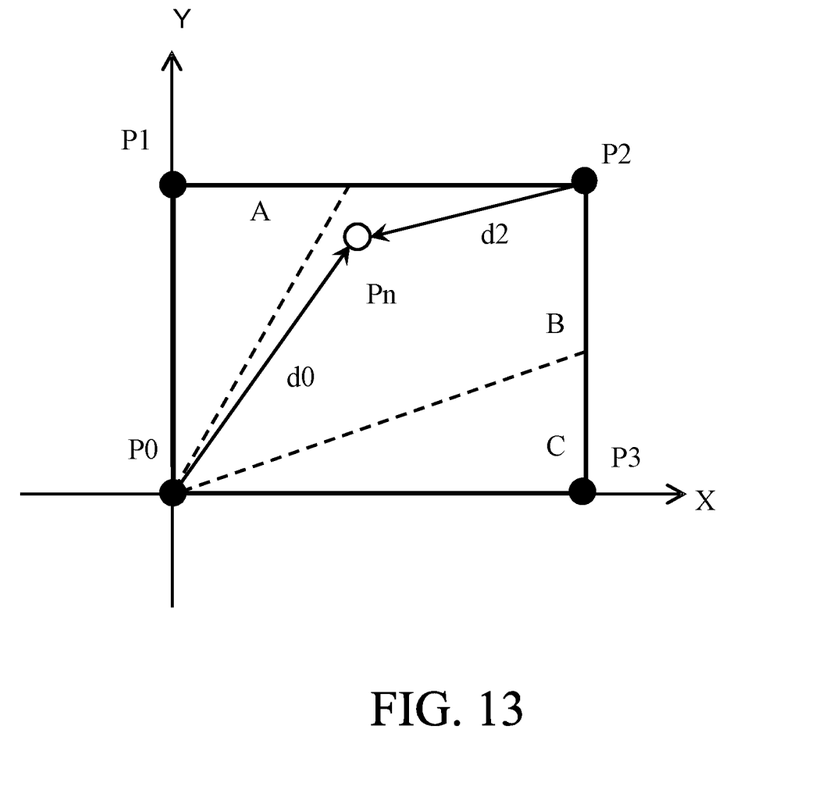
FIG. 13 is an explanatory diagram to explain an interpolation method of the input image in an image height direction.

Hereinafter, a detailed description will be given of an interpolation method. FIG. 12 is a schematic diagram illustrating the input image, an x-axis and a y-axis respectively represent a long side direction and a short side direction of the input image, and an origin of coordinates represents the center of the input image. In this example, as illustrated in FIG. 12, as one example, the input image is divided into eight areas, and information of the PSF of a periphery part of each area and the origin is obtained. FIG. 13 illustrates an enlarged view of a first quadrant in FIG. 12. P0 denotes the origin, and P1, P2 and P3 respectively denote peripheral image heights in areas A, B and C. Pn denotes an arbitrary point (image height) in the image, and in FIG. 13, the point Pn is positioned in the area B to be separated by a distance d0 from the origin P0 and to be separated by a distance d2 from the point P2. When the sharpening filters corresponding to the points P0 and P2 are respectively F0 and F2, interpolation data corresponding to the arbitrary point Pn is expressed as the following Expression (20).

$$Fn = F0 \times (1-d0) + F2 \times d2 \quad (20)$$

Performing such interpolation processing can generate the sharpening filter at the arbitrary image height in each area. Generating the sharpening filter while performing interpolation processing can continuously change the sharpening filter according to the image height.

Expression (20) is a calculation expression regarding the area B of the first quadrant, but data after interpolation processing can be generated by the same operation to the other areas and the other quadrants. Moreover, the calculation expression used for the interpolation of the image height is not limited to Expression (20), may be a quadratic curve and may be weighted by multiplying a predetermined constant to each sharpening filter before the interpolation.

Additionally, the method generating the arbitrary interpolation data from two pieces of data was explained, but increasing the number of data used for interpolation can improve precision of interpolation data. For example, interpolation data Fn corresponding to the arbitrary point Pn may be generated by adding after weighing the sharpening filters corresponding to the origin P0 and the points P1, P2 and P3 according to a distance from the point Pn.

Moreover, when the adjustment coefficient m is changed according to the image height, assigning the adjustment coefficient m corresponding to the image height to parts of the sharpening data F0 and F2 in Expression (20) can generate the adjustment coefficient m after interpolation. In this way, using the interpolated adjustment coefficient m for the sharpening filter can continuously adjust the correction quantity according to the image height.

As mentioned above, in this example, even the image deteriorated by the asymmetrical PSF of the image pickup optical system, which corresponds to the peripheral part of the input image, can be sharpened by correcting the input image precisely.

Herein, in this example, a method to perform the interpolation processing of the sharpening filter to correspond to changes in the image height direction of the PSF was explained, but interpolation processing of the sharpened image g(x,y) may be performed. In this case, assigning the sharpened image g(x,y) corresponding to each image height to the parts of the sharpening data F0 and F2 in Expression (20) can obtain the sharpened image after interpolation in consideration of changes in the image height direction the PSF.

Second Example

An image optical apparatus according to this example has the same configuration as the image pickup optical system according to the first example. An image pickup processing method according to this example is the same as the image processing method according to the image processing method according to the first example except for the process at step S14 in the flowchart of FIG. 9, and thus explanations of the processes from step S11 to step S13 are omitted.

In this example, the sharpening is performed by calculating Expression (18) using the unsharp mask USM(x,y) and the low pass filter LPF(x,y). In the first example, the sharpening is performed by convoluting the input image into the generated sharpening filter. In this example, firstly, the correction component represented by f(x,y)*{LPF(x,y)−USM(x,y)} in Expression (18) is generated using the unsharp mask USM(x,y) and the low pass filter LPF(x,y) generated on the basis of information of the PSF. Next, after adjusting the generated correction component by the adjustment coefficient m, the sharpening is performed by adding to or subtracting from the input image.

Herein, regarding interpolation in the image height direction, as explained in the first example, the interpolation processing may be performed to the sharpened image g(x,y) or the correction component. When the interpolation in the image height to the correction component is performed, assigning the correction component corresponding to each image height to parts of the sharpening data F0 and F2 in Expression (20) can generate the correction after the interpolation. And, after adjusting the correction component after the interpolation using the adjustment coefficient m, the sharpening can be performed by adding to or subtracting from the input image.

Third Example

An image optical apparatus according to this example has the same configuration as the image pickup optical system according to the first example. An image pickup processing method according to this example is the same as the image processing method according to the image processing method according to the first example except for the process at step S14 in the flowchart of FIG. 9, and thus explanations of the processes from step S11 to step S13 are omitted.

In this example, the sharpening is performed by calculating Expression (17) using the unsharp mask USM(x,y) and the low pass filter LPf(x,y). In this example, firstly, the correction component is generated by taking a difference between the input images respectively convoluted with the unsharp mask USM(x,y) and the low pass filter LPF(x,y) generated on the basis of information of the PSF. The correction component is represented by {f(x,y)*LPF(x,y)−f(x,y)*USM (x,y)} in Expression (17). Secondly, after adjusting the generated correction component using the adjustment coefficient m, the sharpening is performed by adding to or subtracting from the input image.

Herein, regarding the interpolation in the image height direction, as explained in the first and second examples, the interpolation processing may be performed to the sharpened image g(x,y) or the correction component. The interpolation processing may be also performed to the unsharp mask USM(x,y) and the low pass filter LPF(x,y). When the interpolation in the image height direction is performed to the unsharp mask USM(x,y), assigning the unsharp mask USM(x,y) corresponding to each image height to parts of the sharpening data F0 and F2 in Expression (20) can generate the unsharp mask USM(x,y) after the interpolation. And, after adjusting the correction component after the interpolation generated using the unsharp mask USM(x,y) by the adjustment coefficient m, the sharpening can be performed by adding to or subtracting from the input image. Furthermore, when the low pass filter LPF(x,y) is changed according to the image height, using Expression (20) can generate the low pass filter LPF after the interpolation as with the unsharp mask USM(x,y).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-044804, filed on Mar. 8, 2016, which is hereby incorporated by reference herein in its entirety.

What is claimed is:

1. An image processing apparatus comprising:
    a processor that sharpens an input image on the basis of a difference between a filter and a low pass filter, which are generated using information regarding a point spread function of an optical system corresponding to an image pickup condition of the optical system, or a difference between an image obtained by applying the filter to an input image generated by imaging through the optical system and an image obtained by applying the low pass filter to the input image.

2. An image processing apparatus according to claim 1, wherein the processor generates a sharpening filter on the basis of a difference between the filter and the low pass filter, and an ideal point image, and sharpens the input image by applying the sharpening filter to the input image.

3. The image processing apparatus according to claim 2, wherein the processor sharpens the input image by convoluting the sharpening filter into the input image.

4. The image processing apparatus according to claim 2, wherein the processor adjusts the sharpening filter using an adjustment coefficient corresponding to a position in the input image.

5. The image processing apparatus according to claim 1, wherein the processor generates a correction component by convoluting a difference between the filter and the low pass filter into the input image, and sharpens the input image by applying the correction component to the input image.

6. The image processing apparatus according to claim 5, wherein the processor sharpens the input image by adding the correction component to the input image.

7. The image processing apparatus according to claim 1, wherein the processor generates a correction component on the basis of a difference between an image obtained by applying the filter to the input image and an image obtained by applying the low pass filter to the input image, and sharpens the input image by applying the correction component to the input image.

8. The image processing apparatus according to claim 7, wherein the processor sharpens the input image by adding the correction component to the input image.

9. The image processing apparatus according to claim 1, wherein the low pass filter is rotationally symmetrical.

10. The image processing apparatus according to claim 1, wherein the low pass filter has a number of taps less than a number of taps of the filter.

11. The image processing apparatus according to claim 1, wherein the processor obtains information regarding the point spread function on the basis of the image pickup condition of the optical system.

12. The image processing apparatus according to claim 1, wherein the image pickup condition is at least one of an image height, a focal length, a F-number and a photographing distance.

13. The image processing apparatus according to claim 1, wherein the low pass filter has characteristics constant to the image pickup condition.

14. The image processing apparatus according to claim 1, wherein the low pass filter has characteristics different for each image pickup condition.

15. An optical apparatus comprising:
an image pickup element that images an object image formed by an optical system; and
an image processing apparatus including a processor that sharpens an input image on the basis of a difference between a filter and a low pass filter, which are generated using information regarding a point spread function of an optical system corresponding to an image pickup condition of the optical system, or a difference between an image obtained by applying the filter to an input image generated by imaging using the image pickup element and an image obtained by applying the low pass filter to the input image.

16. An image processing method comprising:
the step of sharpening an input image on the basis of a difference between a filter and a low pass filter, which are generated using information regarding a point spread function of an optical system corresponding to an image pickup condition of the optical system, or a difference between an image obtained by applying the filter to an input image generated by imaging through the optical system and an image obtained by applying the low pass filter to the input image.

17. A non-transitory computer-readable storage medium configured to store a computer program that enables a computer to execute an image processing method, wherein the image processing method comprises:
the step of sharpening an input image on the basis of a difference between a filter and a low pass filter, which are generated using information regarding a point spread function of an optical system corresponding to an image pickup condition of the optical system, or a difference between an image obtained by applying the filter to an input image generated by imaging through the optical system and an image obtained by applying the low pass filter to the input image.

* * * * *